United States Patent
Vrankovic et al.

(10) Patent No.: US 8,829,839 B1
(45) Date of Patent: Sep. 9, 2014

(54) SYSTEM AND METHOD FOR TEMPERATURE ESTIMATION IN AN INTEGRATED MOTOR DRIVE

(71) Applicant: Rockwell Automation Technologies, Inc., Mayfield, OH (US)

(72) Inventors: Zoran Vrankovic, Greenfield, WI (US); Rongjun Huang, Fox Point, WI (US); Mark Cooper, Eden Prairie, MN (US); David M. Brod, Bloomington, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/795,594

(22) Filed: Mar. 12, 2013

(51) Int. Cl.
  *H02P 31/00* (2006.01)
  *H02P 7/00* (2006.01)
  *H02K 11/00* (2006.01)

(52) U.S. Cl.
  CPC ........ *H02K 11/0047* (2013.01); *H02K 11/0073* (2013.01); *Y10S 388/934* (2013.01)
  USPC ...... 318/472; 318/471; 361/761; 374/E7.009; 388/934

(58) Field of Classification Search
  USPC ..................... 318/400.21, 471–473
  See application file for complete search history.

(56) References Cited

U.S. PATENT DOCUMENTS

| | | | | |
|---|---|---|---|---|
| 6,472,612 | B2 * | 10/2002 | Fartash et al. .................. | 174/260 |
| 7,755,313 | B2 * | 7/2010 | Son et al. ....................... | 318/432 |
| 7,789,794 | B2 * | 9/2010 | Hong et al. ........................ | 477/3 |
| 7,791,300 | B2 * | 9/2010 | Katsuyama et al. .......... | 318/471 |
| 7,859,213 | B2 * | 12/2010 | Serizawa et al. .............. | 318/454 |
| 8,674,651 | B2 * | 3/2014 | Ioannidis ....................... | 318/801 |
| 2013/0119912 | A1 * | 5/2013 | Ayano et al. .................. | 318/472 |
| 2013/0175012 | A1 * | 7/2013 | Yamada et al. ............... | 165/121 |

* cited by examiner

*Primary Examiner* — Burton Mullins
(74) *Attorney, Agent, or Firm* — Boyle Fredrickson, S.C.

(57) ABSTRACT

A system to monitor the temperature of power electronic devices in a motor drive includes a base plate defining a planar surface on which the electronic devices and/or circuit boards within the motor drive may be mounted. The power electronic devices are mounted to the base plate through the direct bond copper (DBC). A circuit board is mounted to the base plate which includes a temperature sensor mounted on the circuit board proximate to the power electronic devices. The temperature sensor generates a digital signal corresponding to the temperature measured by the sensor. A copper pad is included between each layer of the circuit board and between the first layer of the circuit board and the sensor. The circuit board also includes vias extending through each layer of the board. The copper pads and vias establish a thermally conductive path between the temperature sensor and the base plate.

12 Claims, 5 Drawing Sheets

SYSTEM AND METHOD FOR TEMPERATURE ESTIMATION IN AN INTEGRATED MOTOR DRIVE

BACKGROUND OF THE INVENTION

The subject matter disclosed herein relates generally to temperature estimation in a motor drive and, more specifically, to an improved system for monitoring the temperature of power electronic devices in an integrated motor drive.

As is known to those skilled in the art, motor drives are utilized to control operation of a motor. The motor drive is configured to control the magnitude and frequency of the output voltage provided to the motor to achieve, for example, a desired operating speed or torque. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The motor drive includes power electronic switching devices, such as insulated gate bipolar transistors (IGBTs), thyristors, or silicon controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller, such as a microprocessor or dedicated motor controller, generates switching signals to selectively turn on or off each switching device to generate a desired DC voltage on the DC bus or a desired motor voltage.

It is also known that each of the power electronic devices has certain inherent power losses, such as conduction losses and switching losses. Thus, as each of the power electronic devices conducts current or as it is turned on and off, power is dissipated as heat within the device. In order to prevent device failure, it is desirable to monitor the junction temperature of the power electronic devices.

Historically, motor drives have been mounted in control cabinets at a location separated from the motor which it is controlling. The motor drives typically utilize power modules which contain the power electronic devices. A power module may include, for example, six IGBTs and their respective free-wheeling diodes (FWDs). The IGBTs and FWDs are enclosed within a plastic housing and terminals are provided to establish an electrical connection between each power electronic device and the DC bus and/or the motor. Also enclosed within each module may be a thermistor to monitor the temperature of module.

However, developments in the power electronic devices used to control the motor have reduced the size of the components. This reduction in size of the power electronic devices along with a desire to reduce the size of the control enclosures have led to placing at least a portion of the motor controller electronics on the motor itself as an integrated motor drive. Specifically, the inverter section, which converts the DC voltage on the DC bus to the AC voltage supplied to the motor, is mounted on the motor. Because the motors are typically located on a machine or within an industrial process line, it is desirable to use an enclosure for the integrated motor drive which has a footprint equal to or less than the area of the surface on the motor to which it is mounted and which has a low profile, and conventional power modules may not fit within the desired enclosure.

As a result, motor controllers have been developed in which individual power electronic devices are mounted within the housing to form an inverter section. The individual power electronic devices may be mounted in a smaller area than traditional power modules. However, by eliminating the traditional power module, the thermistor is no longer present. Providing a separate thermistor within the integrated motor drive has its drawbacks. The thermistor generates an analog signal that is susceptible to interference from modulation of the power electronic devices. Further, the analog signal requires conversion of the signal to a digital signal prior to being input to a controller and isolation of the signal from the controller. Finally, the signal generated is non-linear and requires calibration and compensation within the controller.

Thus, it would be desirable to provide an improved system and method for monitoring the temperature of power electronic devices in an integrated motor drive.

BRIEF DESCRIPTION OF THE INVENTION

The subject matter disclosed herein describes a system to monitor the temperature of power electronic devices in a motor drive and, more specifically, the junction temperature of power electronic devices utilized in an integrated motor drive. The motor drive includes a base plate, typically a copper base plate, defining a planar surface on which the electronic devices and/or circuit boards within the motor drive may be mounted. The power electronic devices are mounted to the base plate through the direct bond copper (DBC). A circuit board is mounted proximate to the power electronic devices and includes solder pads configured to establish electrical connections between the power electronic devices and the control and power circuits in the integrated motor drive. These electrical connections conduct, for example, the switching signals to control operation of the power electronic devices as well as the DC voltage from the DC bus through the power electronic device to the motor. A temperature sensor is mounted on the circuit board proximate to these solder pads and, therefore, proximate to the power electronic devices. The temperature sensor generates a digital signal corresponding to the temperature measured by the sensor. The circuit board may be single layer, but is more commonly a multi-layer board. A copper pad is included between each layer of the circuit board and between the first layer of the circuit board and the sensor. The circuit board also includes multiple vias extending through each layer of the board between temperature sensor and the base plate. Each via includes a thermally conductive material such as copper lining its inner periphery. Optionally, each via may be filled with a thermally conductive material, such as solder. The copper pads and vias establish a thermally conductive path between the temperature sensor and the base plate having known or controlled thermal characteristics.

According to one embodiment of the invention, a temperature detection system for estimating a junction temperature of power electronic devices in a motor drive includes a base plate, a plurality of power electronic devices, and a sensor. Each power electronic device is mounted to the base plate and mounted proximate to each other within the integrated motor drive, and the sensor generates a digital signal corresponding to a measured temperature within the integrated motor drive. The temperature detection system also includes a circuit board, having a front surface and a rear surface, where the rear surface is mounted to the base plate, the front surface is configured to receive the sensor, and the sensor is located on the circuit board proximate to the power electronic devices. A copper pad is mounted on the front surface of the circuit board defining a thermally conductive path between the circuit board and the sensor.

According to another embodiment of the invention, a power converter for controlling operation of a motor and configured to be mounted to the motor includes a housing configured to be mounted to a surface of the motor. The power converter includes an input connection and at least one output connection. The input connection is mounted in the housing and configured to receive a DC voltage greater than 50 volts, and at least one output is configured to be electrically connected to the motor. Each output extends between an opening in the housing and an opening in the surface of the motor to which the housing is mounted. A DC bus is electrically connected between the input connection and an inverter section. The inverter section includes at least one power switching device, configured to selectively connect the DC bus to one of the outputs. The power converter further includes a base plate at least partially enclosed within the housing and a circuit board mounted to the base plate. Each of the power switching devices is mounted to the base plate. A sensor generates a digital signal corresponding to a measured temperature, where the sensor is mounted to the circuit board proximate to one of the power switching devices, and a processor is mounted on the circuit board and configured to receive the digital signal from the sensor.

According to yet another embodiment of the invention, a method of determining a junction temperature of a power electronic device in an integrated motor drive is disclosed. The power electronic device is mounted to a base plate within the integrated motor drive. The method includes the steps of mounting a circuit board on the base plate and mounting a sensor on the portion of the circuit board proximate to the power electronic device. At least a portion of the circuit board is proximate to the power electronic device, and the circuit board includes a thermally conductive pad between the sensor and a top surface of a first layer of the circuit board. A digital signal is generated from the sensor, corresponding to a temperature measured by the sensor. The digital signal is received by a processor, and the processor uses a thermal model of heat transfer between the power electronic device and the sensor to determine an estimate of the junction temperature of the power electronic device as a function of the thermal model and of the digital signal from the sensor.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
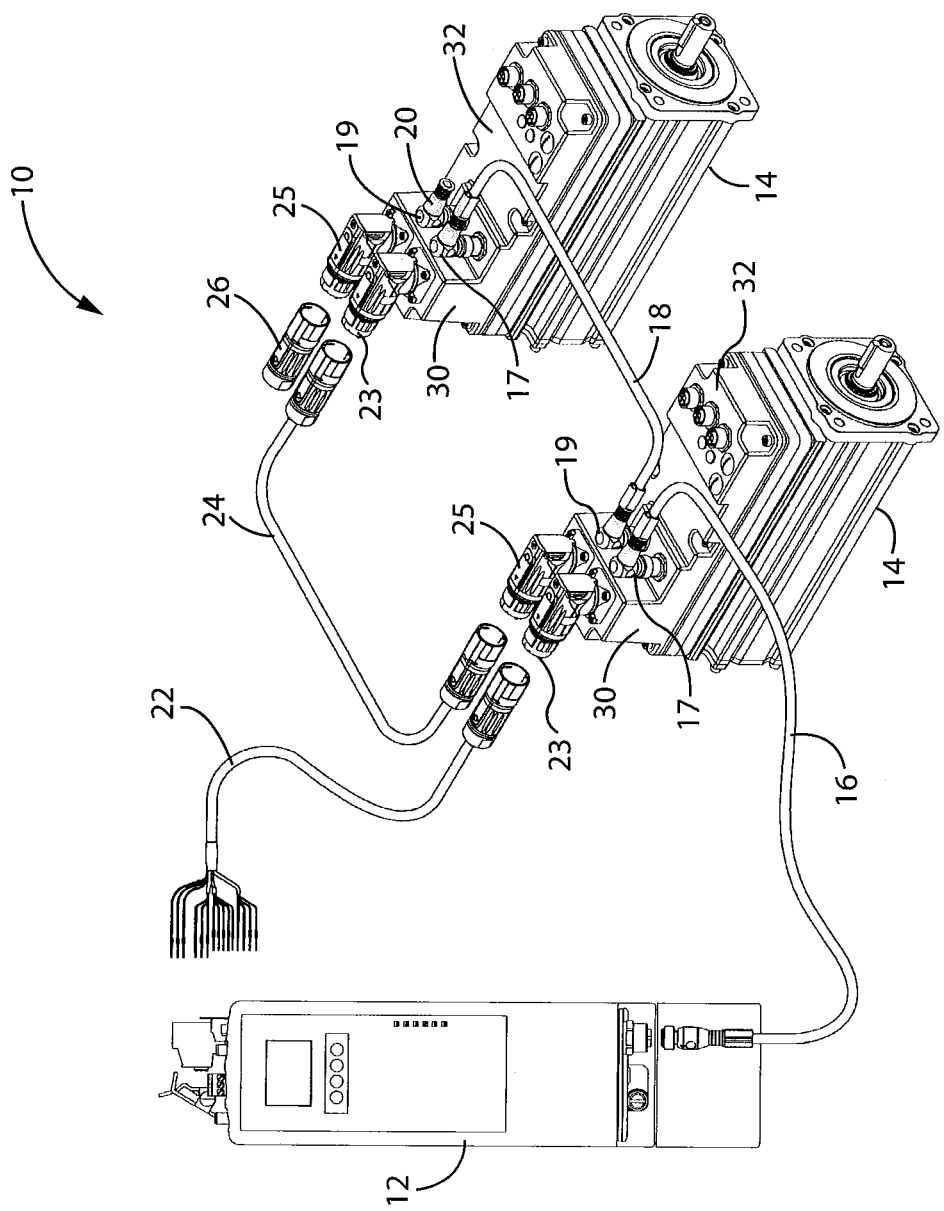
FIG. 1 is an exemplary motor control system illustrating a pair of integrated motor drives incorporating the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an exemplary embodiment of a distributed motor control system 10 includes a power interface module 12, a pair of motors 14, and a pair of integrated motor drives 30. Each integrated motor drive 30 includes a housing 32 configured to mount the integrated motor drive 30 to one of the motors 14. It is contemplated that the distributed control system 10 may include various other numbers of motors 14 and integrated motor drives 30. A first communication cable 16 is connected between the power interface module 12 and a first communication connector 17 on the first integrated motor drive 30. A second communication cable 18 connects a second communication connector 19 from the first integrated motor drive 30 to the first communication connector 17 on the second integrated motor drive 30. Similarly, additional second communication cables 18 may be provided to connect additional integrated motor drives 30, if provided, in the distributed motor control system 10. A communications terminating connector 20 is provided on the second communication connector 19 of the final integrated motor drive 30 in the distributed motor control system 10. A first power cable 22 is connected between the power interface module 12 and a first power connector 23 on the first integrated motor drive 30. A second power cable 24 connects a second power connector 25 from the first integrated motor drive 30 to the first power connector 23 on the second integrated motor drive 30. Similarly, additional second power cables 24 may be provided to connect additional integrated motor drives 30, if provided, in the distributed motor control system 10. A power terminating connector 26 is provided on the second power connector 25 of the final integrated motor drive 30 in the distributed motor control system 10. According to various embodiments of the invention, it is contemplated that the first and second communication connectors, 17 and 19 respectively, may be identical connectors, the first and second communications cables, 16 and 18 respectively, may be identical cables of the same or of varying length, the first and second power connectors, 23 and 25 respectively, may be identical connectors, and the first and second power cables, 22 and 24 respectively, may be identical cables of the same or of varying length.

Figure 2:
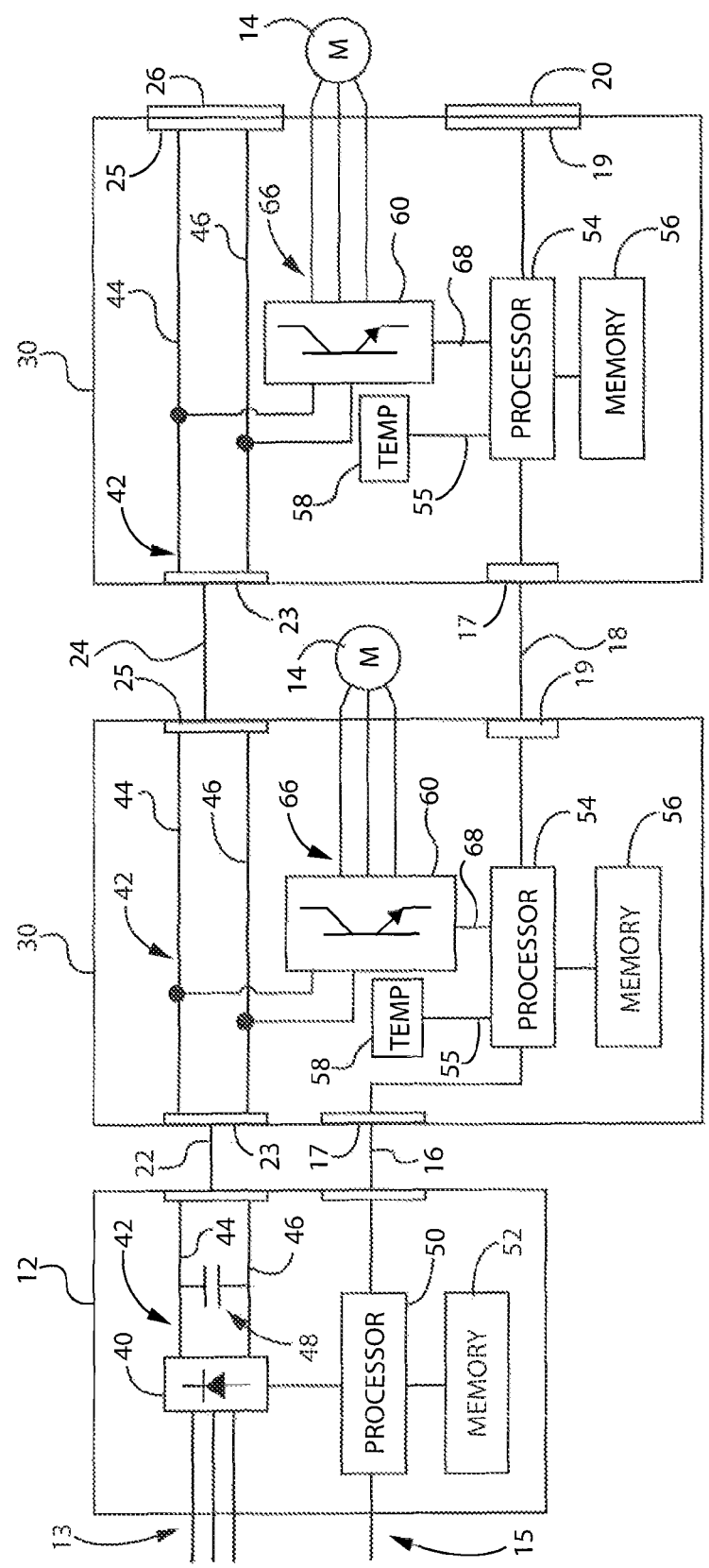
FIG. 2 is a schematic representation of the motor control system of FIG. 1.

Referring next to FIG. 2, the power interface module 12 includes a rectifier section 40, connected in series between the input voltage 13 and a DC bus 42, and a DC bus capacitor 48 connected across the DC bus 42. It is understood that the DC bus capacitor 48 may be a single capacitor or multiple capacitors connected in parallel, in series, or a combination thereof. The rectifier section 40 may be either passive or active, where a passive rectifier utilizes electronic devices such as diodes, which require no control signals, and an active rectifier utilizes electronic devices, including but not limited to transistors, thyristors, and silicon controlled rectifiers, which receive switching signals to turn on and off. The power interface module 12 also includes a processor 50 and a memory device 52. It is contemplated that the processor 50 and memory device 52 may each be a single electronic device or formed from multiple devices. Optionally, the processor 50 and/or the memory device 52 may be integrated on a field programmable array (FPGA) or an application specific integrated circuit (ASIC). The processor 50 may send and/or receive signals to the rectifier section 40 as required by the application requirements. The processor 50 is also configured to communicate with external devices via an industrial network 15, including but not limited to, DeviceNet, ControlNet, or Ethernet/IP and its respective protocol. The processor 50 further communicates with other devices within the motor control system 10 via any suitable communications medium, such as a backplane connection or an industrial network, which may further include appropriate network cabling and routing devices.

The DC bus 42 includes a first voltage rail 44 and a second voltage rail 46. Each of the voltage rails, 44 or 46, are configured to conduct a DC voltage having a desired potential, according to application requirements. According to one embodiment of the invention, the first voltage rail 44 may have a DC voltage at a positive potential and the second voltage rail 46 may have a DC voltage at ground potential. Optionally, the first voltage rail 44 may have a DC voltage at ground potential and the second voltage rail 46 may have a DC voltage at a negative potential. According to still another embodiment of the invention, the first voltage rail 44 may have a first DC voltage at a positive potential with respect to the ground potential and the second voltage rail 46 may have a second DC voltage at a negative potential with respect to the ground potential. The resulting DC voltage potential between the two voltage rails, 44 and 46, is the difference between the potential present on the first voltage rail 44 and the second voltage rail 46.

According to one embodiment of the invention, the DC bus 42 of the power interface module 12 is connected in series with the DC bus 42 of each of integrated motor drives 30. Electrical connections are established between the respective DC buses 42 via the power cable 22, 24 to transfer the DC bus voltage between devices. Each integrated motor drive 30 further includes a processor 54 and a memory device 56. It is contemplated that the processor 54 and memory device 56 may each be a single electronic device or formed from multiple devices. Optionally, the processor 54 and/or the memory device 56 may be integrated on a field programmable array (FPGA) or an application specific integrated circuit (ASIC).

Figure 3:
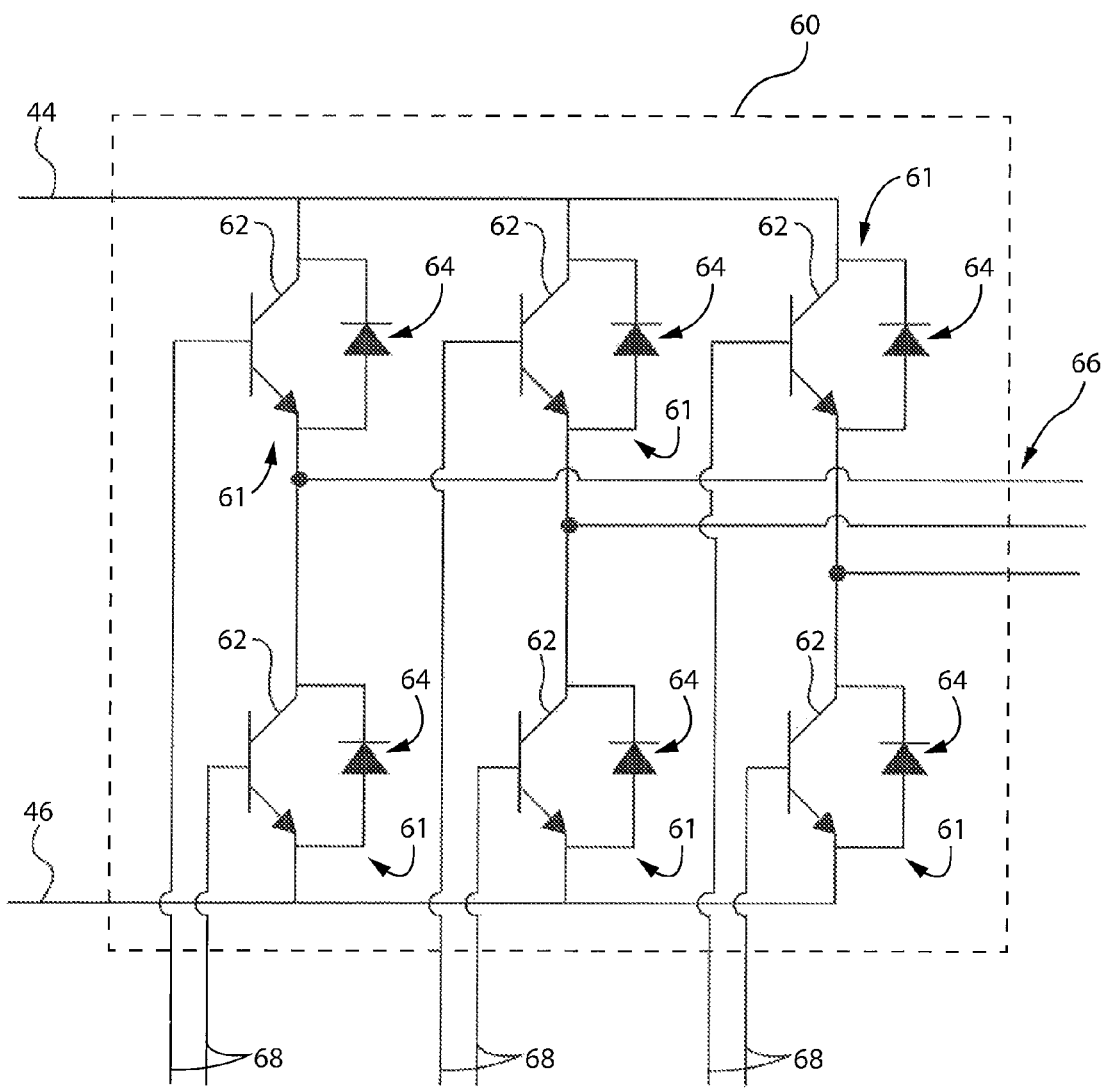
FIG. 3 is a schematic representation of an inverter section of FIG. 2.

The DC voltage on the DC bus 42 is converted to an AC voltage by an inverter section, 60. According to one embodiment of the invention, each inverter section 60 converts the DC voltage to a three-phase output voltage available at an output 66 connected to the respective motor 14. The inverter section 60 includes multiple switches 61 which selectively connect one of the output phases to either the first voltage rail 44 or the second voltage rail 46. Referring also to FIG. 3, each switch 61 may include a transistor 62 and a diode 64 connected in parallel to the transistor 62. Each transistor 62 receives a switching signal 68 to enable or disable conduction through the transistor 62 to selectively connect each phase of the output 66 to either the first voltage rail 44 or the second voltage rail 46 of the DC bus 42.

Figure 4:
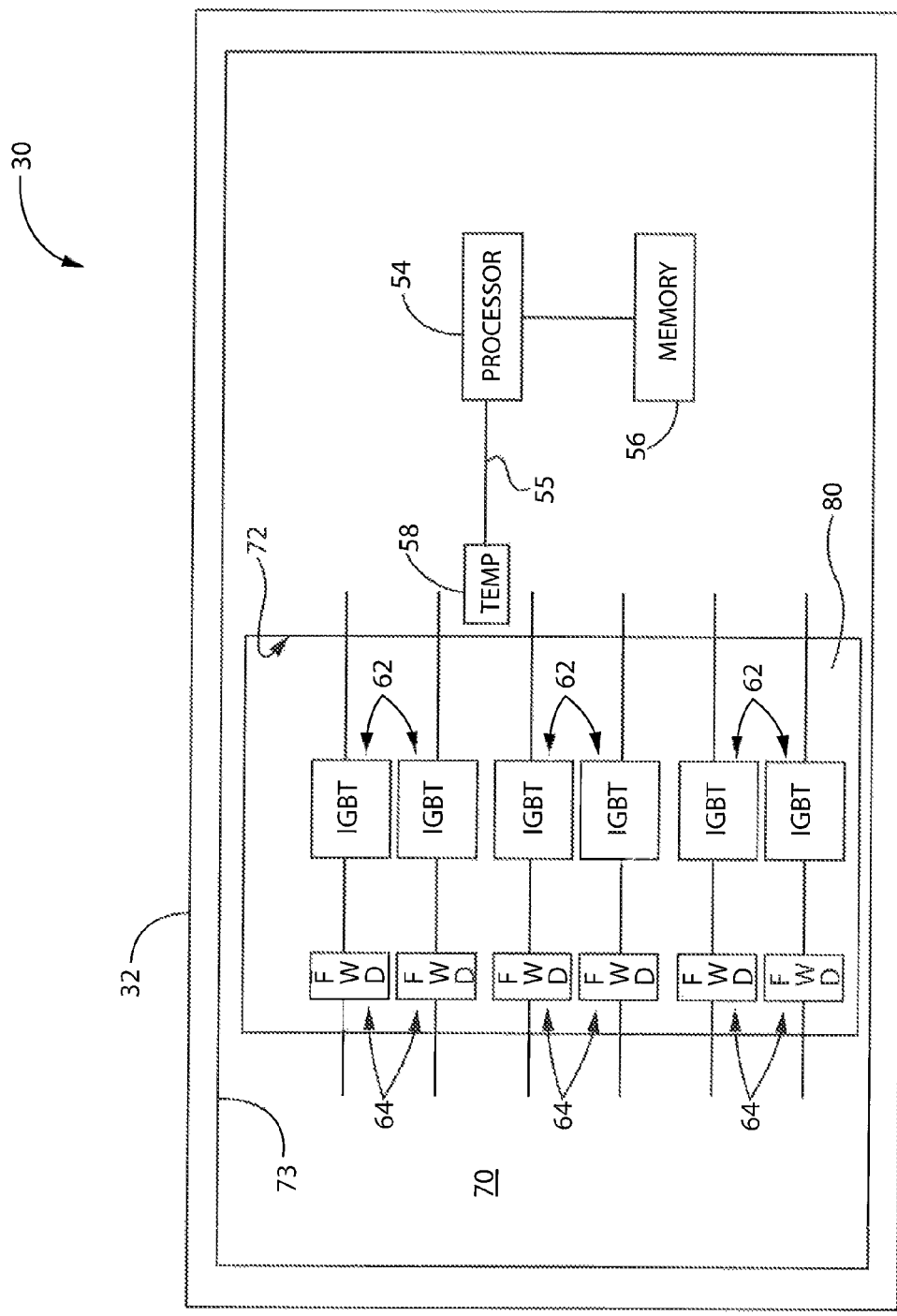
FIG. 4 is a block diagram representation of a portion of one of the integrated motor drives of FIG. 1.

Referring next to FIG. 4, each integrated motor drive 30 includes a base plate 80 mounted within the housing 32. The base plate 80 is constructed of a thermally conductive material such as a metal. According to one embodiment of the invention, the base plate 80 is made from copper. As illustrated, a circuit board 70 is mounted over the base plate 80 and has an outer periphery 73 that is equal to or greater than the outer periphery of the base plate 80. Optionally, the outer periphery of the base plate 80 may be greater than the outer periphery 73 of the circuit board 70. It is contemplated that the circuit board 70 may be a single circuit board or multiple circuit boards mounted to and covering various portions of the base plate 80. Optionally, the circuit board 70 may further include multiple boards, mounted one over the other or in various other configurations without deviating from the scope of the invention. The base plate 80 is exposed through an opening 72 in the circuit board 70. Each of the power electronic devices (e.g., the IGBT 62 and the FWD 64) are mounted to the base plate 80, also referred to as direct bonded copper (DBC) devices. A temperature sensor 58 is mounted to the circuit board 70 proximate to the opening 72 and, therefore, proximate to the power electronic devices 62, 64. According to one embodiment of the invention, the temperature sensor 58 is located within 5.0 cm, preferably within 1.5 cm, and more preferably about 0.6 cm from the power electronic devices. The temperature sensor 58 generates a digital signal 55 corresponding to the measured temperature which may be provided to the processor 54. The processor 54, executing a program stored in the memory device 56, may be configured to monitor the digital signal 55 from the temperature sensor 58 and generate alerts and/or shut down operation of the integrated motor drive 30 as a function of the measured temperature.

Figure 5:
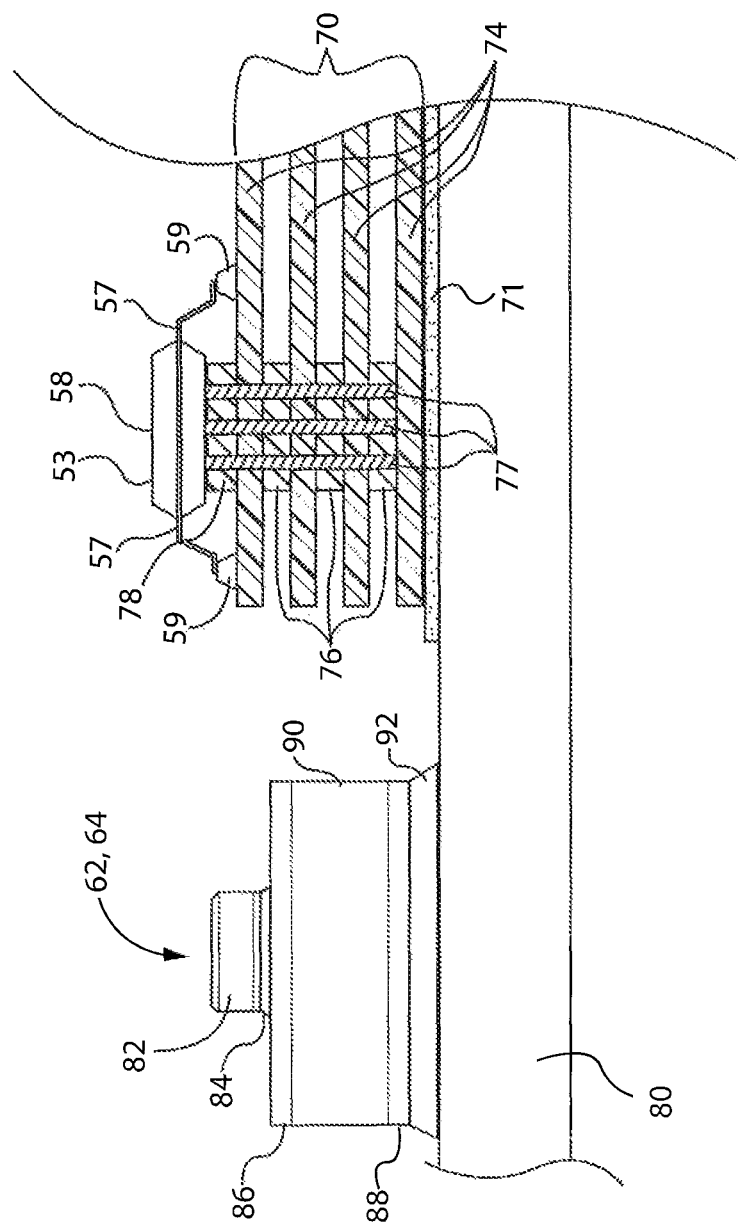
FIG. 5 is a partial cross-sectional view of one of the integrated motor drives of FIG. 1.

Referring next to FIG. 5, each of the power electronic devices includes a bare die power electronic device 82, such as an IGBT or FWD, mounted to a first copper layer 86 via solder 84. A ceramic layer 90 separates the first copper layer 86 from a second copper layer 88, and the second copper layer 88 is, in turn, mounted to the base plate 80 via solder 92. The first copper layer 86 may be etched to form conductive paths, or traces, between multiple power electronic devices 82 mounted to the first copper layer 86. The ceramic layer 90 provides an electrically insulating layer between the first and second copper layers, 86 and 88 respectively. The second copper layer 88 may be, for example, a ground plane.

According to the illustrated embodiment, the circuit board 70 is a multi-layer board and, more specifically, includes four layers 74. Optionally, the circuit board 70 may include six, or any other suitable number of layers 74 according to the application requirements. The circuit board 70 is secured to the copper base plate by glue or by any other suitable fastener, for example, via mounting screws. A layer of glue and dielectric grease 71 may be included between the circuit board 70 and the base plate 80 to secure the circuit board 70 and to provide a thermally conductive layer between the circuit board 70 and the base plate 80. The temperature sensor 58 includes a body 53 from which leads 57 extend. The leads 57 are secured to the first layer 74 of the circuit board 70 by solder joints 59 according to methods understood in the art. A first copper pad 78 is located on the first layer 74 of the circuit board 70 between the front side of the first layer 74 and the rear side of the temperature sensor 58. Additional copper pads 76 are located between each of the layers 74 of the circuit board 70 positioned between the temperature sensor 58 and the base plate 80. Multiple vias 77 are also located between the temperature sensor 58 and the base plate 80. The vias 77 extend through one or more layers 74 of the circuit board 70 and, preferably, extend through each layer 74 of the circuit board 70 except the layer 74 secured to the base plate 80. The first copper pad 78, additional copper pads 76, and vias 77 are, preferably, electrically isolated from circuit components mounted on the circuit board 70.

In operation, the power interface module 12 receives an AC input voltage 13 and converts it to a DC voltage with the rectifier section 40. The AC input voltage 13 may be either a three phase or a single phase AC voltage. If the rectifier section 40 is an active rectifier, the processor 50 will receive signals from the active rectifier corresponding to, for example, amplitudes of the voltage and current on the AC input and/or the DC output. The processor 50 then executes a program stored in memory 52 to generate switching signals to activate and/or deactivate the switches in the active rectifier, where the program includes a series of instructions executable on the processor 50. In addition, the switching signals may be generated such that power may be transferred in either direction between the AC input and the DC output. Whether there is a passive rectifier or an active rectifier, the DC bus capacitor 48 connected across the DC bus 42 reduces the ripple resulting from the voltage conversion. The DC voltage is then provided via the DC bus 42 between the power interface module 12 and subsequent integrated motor drives 30. The level of DC voltage transferred via the DC bus 42 is typically greater than 50 volts and may be, for example, at least 325 VDC if the AC input voltage 13 is 230 VAC or at least 650 VDC if the AC input voltage 13 is 460 VAC.

The processor 50 of the power interface module 12 may further be configured to communicate with other external devices via the industrial network 15. The processor 50 may receive command signals from a user interface or from a control program executing, for example, on an industrial controller. The command signals may include, but are not limited to, speed, torque, or position commands used to control the rotation of each motor 14 in the distributed motor control system 10. The processor 50 may either pass the commands directly or execute a stored program to interpret the commands and subsequently transmit the commands to each integrated motor drives 30. The processor 50 communicates with the processors 54 of the integrated motor drives 30 either directly or via a daisy chain topology and suitable network cables 16, 18. Further, the processor 50 may either communicate using the same network protocol with which it received the commands via the industrial network 15 or convert the commands to a second protocol for transmission to the integrated motor drives 30.

Each integrated motor drive 30 converts the DC voltage from the DC bus 42 to an AC voltage suitable to control operation of the motor 14 on which it is mounted. The processor 54 executes a program stored on a memory device 56. The processor 54 receives a reference signal via the communications medium 16 or 18 identifying the desired operation of the motor 14. The program includes a control module configured to control the motor 14 responsive to the reference signal and responsive to feedback signals such as voltage sensors, current sensors, and/or the angular position sensors mounted to the motor 14. The control module generates a desired voltage reference signal and provides the desired voltage reference signal to a switching module. The switching module uses, for example, pulse width modulation (PWM) to generate the switching signals 68 to control the switches 61 responsive to the desired voltage reference signal.

In order to protect the switches 61 in the inverter section 60, the processor 54 monitors the temperature signal 55 generated by the temperature sensor 58. The processor 54 then determines an estimate of the temperature of the switches as a function of the temperature signal 55 and of a thermal model of the heat transfer path between the temperature sensor 58 and the switches 61. It is contemplated that a single thermal model may be determined to generate a single temperature estimate. Optionally, separate thermal models may be determined to generate temperature estimates for each of the power electronic devices. According to still another embodiment of the invention, a first thermal model may be determined to generate an estimated junction temperature of the IGBTs 62 and a second thermal model may be determined to generate an estimated junction temperature of the FWDs 64.

Each thermal model includes three primary thermal impedances. A first thermal impedance is determined for the transfer of heat between the bare die power electronic device 82 and the base plate 80. A second thermal impedance is determined for the transfer of heat between the base plate 80 and the temperature sensor 58. Inclusion of the first copper pad 78, additional copper pads 76, and vias 77 improves the thermal conductance between the base plate 80 and the temperature sensor 58 or, conversely, reduces the thermal impedance between the base plate 80 and the temperature sensor 58. The third thermal impedance exists inside the base plate 80 from the location below the IGBTs 62 or the FWDs 64 and the location below the temperature sensor 58. Because the temperature sensor 58 is placed proximate to the IGBTs 62 and the FWDs 64 and because the base plate 80 has a high thermal conductance, the third thermal impedance is much less than first and the second thermal impedance.

Each thermal model is also a function of the power dissipated in the corresponding power electronic device. The power electronic devices incur both switching losses and conduction losses which are primarily dissipated within the device as heat. The magnitude of the switching loss and conduction loss are additionally a function of the current conducted through the device. The processor 54 monitors at least one feedback signal corresponding to the current output to the motor 14 and may determine an average power loss in each of the IGBTs 62 and/or the FWDs 64. In addition, distribution of power losses among the power electronic devices may vary at varying frequency of output voltage to the motor 14. According to one embodiment of the invention, the processor 54 monitors at least one of a speed command or a speed feedback signal to determine the speed of the motor 14 and may further utilize the speed information in each of the first and second thermal models. According to another embodiment of the invention, the processor 54 may monitor a commanded frequency of the output voltage to the motor 14 and determine the speed of the motor. According to still another embodiment of the invention, $BF_{J}(f)$ and $BF_{D}(f)$ may be determined as frequency dependent compensation factors and the commanded output frequency may be utilized directly by each thermal model. The processor 54 then determines the temperature of the IGBTs 62 as a function of the first thermal model and determines the temperature of the FWDs 64 as a function of the second thermal model.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A temperature detection system for estimating a junction temperature of power electronic devices in a motor drive, the system comprising:
 a base plate;
 a plurality of power electronic devices, each power electronic device mounted to the base plate and mounted proximate to each other within the motor drive;
 a sensor generating a digital signal corresponding to a measured temperature within the motor drive;
 a circuit board having a front surface and a rear surface, wherein the rear surface is mounted to the base plate and the front surface is configured to receive the sensor and wherein the sensor is located on the circuit board proximate to the power electronic devices; and
 a copper pad on the front surface of the circuit board defining a thermally conductive path between the circuit board and the sensor.

2. The temperature detection system of claim 1 wherein the circuit board includes a plurality of layers and a plurality of copper pads between each of the layers and aligned with the copper pad on the front surface.

3. The temperature detection system of claim 1 wherein the circuit board includes a plurality of layers and a plurality of vias extending through at least a portion of the layers between the base plate and the sensor.

4. The temperature detection system of claim 3 wherein the circuit board further includes a plurality of additional copper pads between each of the layers and aligned with the copper pad on the front surface.

5. The temperature detection system of claim 4 wherein, the copper pad, each of the additional copper pads, and each of the vias between the sensor and the base plate are isolated from electrically conductive traces on the circuit board.

6. The temperature detection system of claim 1 further comprising:
 a memory device configured to store a series of instructions and at least one thermal model; and
 a processor configured to receive the digital signal from the sensor and configured to execute the series of instructions to determine a temperature as a function of the thermal model and of the digital signal.

7. The temperature detection system of claim 6 wherein the thermal model is a function of at least one of an average power loss in the power electronic devices during operation and a frequency of a voltage output to a motor connected to the motor drive.

8. The temperature detection system of claim 1 wherein the sensor is located less than 1.5 cm from the power electronic devices.

9. A method of determining a junction temperature of a power electronic device in an integrated motor drive, wherein the power electronic device is mounted to a base plate within the integrated motor drive, the method comprising the steps of:
 mounting a circuit board on the base plate, wherein at least a portion of the circuit board is proximate to the power electronic device;
 mounting a sensor on the portion of the circuit board proximate to the power electronic device, wherein the circuit board includes a thermally conductive pad between the sensor and a front surface of a first layer of the circuit board;
 generating a digital signal from the sensor corresponding to a temperature measured by the sensor;
 receiving the digital signal with a processor;
 obtaining a thermal model of heat transfer between the power electronic device and the sensor from a memory device in communication with the processor; and
 determining the junction temperature of the power electronic device by the processor as a function of the thermal model and of the digital signal from the sensor.

10. The method of claim 9 further comprising the step of determining an average power loss of the power electronic device during operation of the integrated motor drive, wherein the junction temperature is determined as a function of the thermal model, the digital signal, and the average power loss.

11. The method of claim 9 further comprising the step of determining a frequency of a voltage output to a motor connected to the integrated motor drive, wherein the junction temperature is determined as a function of the thermal model, the digital signal, and the frequency of the voltage output to the motor.

12. The method of claim 9 further comprising the steps of:
 determining an average power loss of the power electronic device during operation of the integrated motor drive; and
 determining a frequency of a voltage output to a motor connected to the integrated motor drive, wherein the junction temperature is determined as a function of the thermal model, the digital signal, the average power loss, and the frequency of the voltage output to the motor.

\* \* \* \* \*